United States Patent [19]
Okamoto et al.

[11] 3,729,236
[45] Apr. 24, 1973

[54] ANTI-SKID BRAKE CONTROL ARRANGEMENT FOR VEHICLE WHEELS

[75] Inventors: Tosiaki Okamoto; Masami Inada; Katuki Takayama, all of Kariya-shi, Japan

[73] Assignee: Aisin Seiki Company, Limited, Aichi-ken, Japan

[22] Filed: May 16, 1969

[21] Appl. No.: 825,350

[30] Foreign Application Priority Data

May 18, 1968 Japan..................43/33655

[52] U.S. Cl...................303/21 F, 303/6 C
[51] Int. Cl...................B60t 8/12, B60t 8/26
[58] Field of Search..................303/21 F, 21 CG, 303/6 C, 61–63, 68–69; 188/181

[56] References Cited

UNITED STATES PATENTS

| | | | |
|---|---|---|---|
| 3,306,677 | 2/1967 | Dewar et al. | 303/21 |
| 3,486,800 | 12/1969 | Ayers | 303/21 |
| 3,495,882 | 2/1970 | Stelzer | 303/21 |

*Primary Examiner*—Duane A. Reger
*Attorney*—Sughrue, Rothwell, Mion, Zinn & Macpeak

[57] ABSTRACT

This invention relates to a hydraulic pressure control valve arrangement for automotive vehicle wheel brake systems, the latter system comprising a hydraulic master cylinder to be actuated by operating a foot brake pedal; a hydraulic brake pressure control valve assembly provided with a pneumatic servo piston means; and electromagnetic change-over valve assembly fluidically connected therewith; a skid sensor operatively connected therewith and also with a vehicle wheel; and wheel cylinder means for applying hydraulic braking effort upon vehicle wheels. The improvement comprises the provision of a control valve of orifice type in said hydraulic brake pressure control valve assembly, for bringing the working stroke of said servo piston to realize in a rapid way during reduction of the effective volume of the hydraulic circuit leading from said pressure control valve assembly to wheel cylinder means in case of an overbrake application, and until a certain stage of said working stroke, and then carrying about the latter in a highly slow and continuous way.

2 Claims, 3 Drawing Figures

ANTI-SKID BRAKE CONTROL ARRANGEMENT FOR VEHICLE WHEELS

This invention relates to improvements in and relating to the antiskid brake control arrangement for powered vehicles, and adapted for the prevention of wheel skid which is caused to take place mainly by exerting an excess hydraulic braking effort upon the vehicle wheels.

With the conventional brake control arrangement of the above kind, the brake control function is carried into effect in such a way that when the vehicle wheel or wheels become nearly or perfectly skidded, a sensor, preferably of A. C. generator type, is actuated to deliver an electrical instruction signal which is then utilized for releasing the applied hydraulic wheel cylinder pressure for avoiding a wheel skid or releasing the skidded condition. Then, the wheel recovers its rotational speed to a certain degree, and said delivery of the electric instruction signal is interrupted for allowing the hydraulic wheel cylinder to increase because of the continued brake application effort made by the vehicle driver, and so on. These release and increase of the hydraulic wheel cylinder pressure occur generally in a so-to-speak infinitely repeated manner and, indeed, at a comparatively high frequency. This hydraulic brake control phenomenon results naturally in an unnecessarily large amount of otherwise effective hydraulic pressure released in vain without being utilized for the wheel braking purpose. In addition, it has been experienced that unpleasant shocks are sensed by the driver and occasional passengers.

On the other hand, as will be more fully described hereinafter by reference to FIG. 3, the adhesion coefficient between the wheel and the ground, generally being denoted by $\mu$, varies with the slip ratio. This coefficient will generally attain its maximum value with the slip ratio ranging between about 0.15 and 0.2. With the wheels locked with the ground the coefficient will become considerably lower than the attainable maximum value. It will thus be seen that an increase of hydraulic wheel cylinder pressure results in a correspondingly increased wheel braking effect with the adhesion coefficient ranging from the lowest value to that nearly equal to the maximum one which corresponds practically to slip ratio of 0.15–0.2. Or conversely, when the adhesion coefficient exceeds the maximum value, an increase of the hydraulic brake pressure will result in a rather retarded braking effect.

It is therefore the main object of the invention to provide an antiskid hydraulic brake control arrangement for powered vehicles, capable of suppressing the number of repeating cycles of the hydraulic brake pressure release and increase to a possible minimum in an overbraking condition of the hydraulic wheel brake system, yet providing a chance of attaining a shortest possible braking period.

These and further objects, features and advantages will become more apparent when read the following detailed description of a preferred embodiment of the invention by reference to the accompanying drawing which constitutes a part of the present specification.

Figure 1:
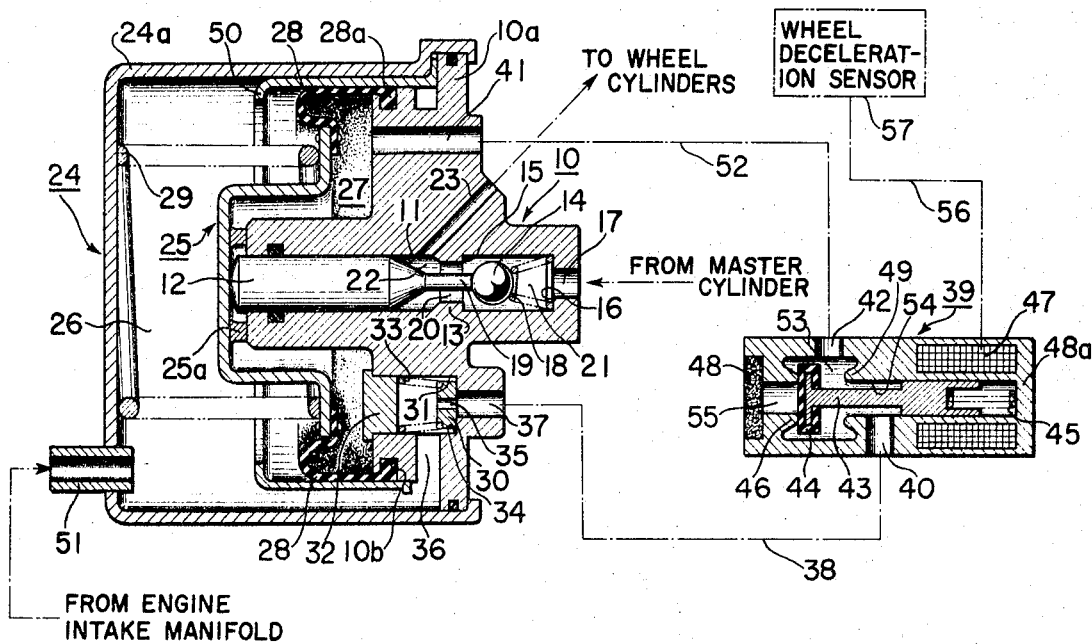
FIG. 1 is a schematic sectional view of a preferred embodiment of the brake pressure control arrangement.

Referring now to the drawing, more specifically FIG. 1 thereof, numeral 10 denotes a control cylinder having a bore 11 passing axially therethrough and comprising two hydraulic chambers 21 and 22. The bore 11 opens at its regular bore diameter and the related or left-hand chamber 22 houses slidably a plunger 12. Between the chambers 21 and 22, there is provided a collar 13 defining a reduced valve opening 20 and a valve seat 15 at the right-hand side of said collar for cooperation with a check valve ball 14. The right-hand end of the bore 11 or more specifically the right-hand chamber 21 is defined by a ring shoulder 16 which defines in turn an inlet opening at 17. This inlet is hydraulically connected with the outlet of a conventional master cylinder, not shown, which is commonly used in the automotive hydraulic brake system.

A compression spring 18 is provided between the ball 14 and the shoulder 16, thereby the ball being resiliently urged so as to keep a pressure engagement with a reduced end 19 of the hydraulic plunger 12 and in the valve-closing direction. The reduced plunger end 19 passes through valve opening 20 with considerable play as shown. The bore chambers 21 and 22 are hydraulically separated from each other when the check ball 14 is brought into its valve closing position for tightly contacting with the mating valve seat 15. The chamber 22 is hydraulically connected through a piping 23, only schematically shown, to wheel cylinder or cylinders, not shown only for simplicity.

The numeral 24 denotes a cylinder housing with its right-hand open end sealingly and fixedly attached to a peripheral flange 10a of control cylinder 10. Within the interior space of the cylinder housing, there is provided a diaphragm piston 25 and said space is divided thereby into two chambers 26 and 27. The diaphragm part at 28 of this piston is fixedly attached at its outer peripheral and enlarged end 28a and through the intermediary of an open cup member 50 to the control cylinder 10 which is formed for this purpose with a peripheral groove 10b. A compression spring 29 is provided between the end wall 24a of cylinder housing 24 and said diaphragm piston 25 for resiliently urging the latter towards the control cylinder 10. In the normal position of the diaphragm piston 25, the latter is kept with its abutting ring 25a in pressure contact with the left-hand end of said control cylinder 10 as shown. The strength of said compression spring 29 serving for returning service for said diaphragm piston is selected to be considerably strong so that it overcomes the combined counter force consisting of hydraulic brake pressure and the valve urging spring force at 16, so far as the hydraulic pressure remains below a certain predetermined value, said combined force being transmitted through the plunger 12 to the diaphragm piston 25.

Below the bore 11 and substantially parallel thereto there is provided a perforated flow control member 30 which abuts under pressure against a shoulder 34 formed in a bore 31 and urged from behind by a backup pressure spring 33 which abuts in turn with its one end against a plug 32 fixedly inserted into the left-hand end of said bore 31. The member 30 is formed with an orifice 35 bored axially therethrough, said orifice communicating through said bore 31 and communication passage 36 with the chamber 26 which is provided with a connection 51 leading through a piping, not shown, to the air intake manifold of the automotive engine, again not shown. On the other hand, said orifice 35 is pneumatically connected through a reduced bore part 37 and a connection piping 38, only schematically shown, to a port 31 of electromagnetically operated valve assembly shown generally at 39 and to be described below.

The chamber 27 is kept in permanent communication with a third bore 41 bored through said control cylinder 10, said bore being pneumatically connected through a piping 52, only schematically shown, with a second port 42 of said valve assembly 39 and said second port being kept normally in communication through the interior space 53 of said assembly 39 to said first port 40. Thus, it will be seen that both chambers 26 and 27 are kept normally in communication with the engine intake manifold acting as a vacuum source.

In the valve assembly 39, there is formed a blind bore 54 in which a valve piston 43 is slidably mounted, the left-hand open end of said bore 54 being kept in permanent communication with said valve interior space 53. Between the right-hand end of said piston 43 and the casing wall 48a, there is mounted an urging spring 45 under compression, while the left-hand end of the piston 43 is formed with an elastic valve member 44. By virtue of the urging spring 45, the valve piston 43 is urged towards left so as to keep its valve closing position shown, wherein the valve member 44 is kept in tight pressure contact with valve seat 46 formed at the innermost end of a bore 55 which is otherwise kept in pneumatic communication with said interior space 53. The opposite or right-hand end of the bore 55 is opened to ambient atmosphere through the intermediary of a porous filtering material 48. The valve assembly 39 is provided with an electromagnetic coil 47 which is energized when receiving an electric signal fed from a wheel deceleration sensor 57 of conventional design. When the automotive wheel or wheels, not shown, should be subjected to a considerable deceleration, for instance by a sudden and severe wheel brake actuation, to a degree beyond a predetermined value, an electrical signal is fed from the sensor 57 to the coil 47 which is thus energized and the valve piston 43 will be electromagnetically urged to move rightwards against the action of spring 45, thereby the valve 44 being separated from the seat 46 and being brought into contact with an oppositely provided valve seat 49 which defines between the space 53 and the bore 54. Therefore, in this case, ambient air will invade through air filter 48 and bore 55 into the interior space 53, thence through port 42, piping 52 and bore 41 to the right-hand chamber 27, on the one hand, and through port 40, piping 38, bore 34, orifice 35 and passage 36 to the left-hand chamber 26 of the valve assembly 10 and 24, on the other.

The operation of the arrangement so far shown and described is as follows:

During the normal braking operation, hydraulic pressure fluid such as pressure oil is conveyed from the master cylinder through inlet opening 17, the left-hand end chamber or valve chamber containing valve ball 14, valve opening 20, the left-hand or plunger-containing chamber 22 and passage 23 to wheel cylinder or cylinders. In this case, the braking operation is normal and thus no further analysis will be needed to set forth for better understanding of the invention.

When the wheels become about to lock with the ground, electric current is issued by the sensor 57 and delivered therefrom to the coil 47 which is then energized, thereby the valve piston 43 being urged to slide rightwards in FIG. 1 against the action of spring 45, as was briefly described hereinabove.

By this rightward movement of the piston 43, the valve member 44 is brought into contact with the opposite seat 49, thereby chambers 26 and 27 being interrupted from pneumatic communication with each other, and ambient atmospheric pressure will invade through air filter 48 and passage bore 55, the now opened valve seat 46, interior space 53, port 42, piping 52 and third bore 41 into the right-hand chamber 27 of the assembly 10 and 24. In this way, there will be a pressure difference between both chambers 26 and 27 and the diaphragm piston 25 will be moved suddenly leftwards in FIG. 1 against the action of return spring 29.

Under these operational conditions, plunger 12 will be moved leftwards in FIG. 1 under the action of urging spring 18, thereby valve ball 14 being brought into its closing position and kept into pressure contact with valve seat 15. By this closure of the valve 14, the hydraulic communication between the master cylinder and the wheel cylinder or cylinders is interrupted. With further leftward movement of diaphragm piston 25, the hydraulic pressure prevailing in the chamber 22 will act upon the plunger 12, the latter being thereby moved further in the left-hand direction in FIG. 1 and the effective volume of the hydraulic circuit starting from the control valve assembly 10 and 24 to the wheel cylinder or cylinders being increased correspondingly. In this way, the hydraulic pressure prevailing in the corresponding wheel cylinder or cylinders will be reduced and the otherwise possible wheel lock with ground will be positively prevented. When the wheels restore its stable rotating condition by the aforementioned reduction in the hydraulic braking pressure, the delivery of electric current from the sensor 57 will be interrupted and the electromagnetic coil 47 will be de-energized. Piston 43 will be then moved leftwards in FIG. 1 under the action of return spring 45, thereby the valve member 44 being brought into contact with the left-hand side seat 46 and pneumatic communication through filter 48 and bore passage 55 with the interior space 53 being thus interrupted.

Under these conditions, the pneumatic pressure now prevailing within chamber 27 will be conveyed through magnetic valve assembly 39 to inlet port 37 and urges to advance the orifice member 30 inwards against the action of return spring 33 so as to enlarge the valved flow passage thereat.

Thence, the pneumatic pressure will be conveyed through passage 36 into the chamber 26, thereby the pressure in the chamber 27 being about to balance out rapidly with that in the chamber 26. When the pneumatic pressure difference between the chambers 26 and 27 attains a certain predetermined value, the flow control valve member 30 will be returned to its normal position under the action of the return spring 33 to contact with shoulder or seat 34. Then, the pneumatic pressure in the chamber 27 is conveyed through the orifice 35 in the valve member 30 into the neighboring chamber 26, thereby the flowing air being subjected to a considerable and rapid throttling action by the orifice.

By controlling the pneumatic pressure of the chamber 27 in the aforementioned way, the piston 25 will return rapidly rightwards from a first time point at which the delivery of electric instruction signal from the skid sensor 57 is interrupted to a second time point at which the pressure difference as appearing between both chambers 26 and 27 attains a certain predetermined value, and when such predetermined pneumatic pressure difference is attained and the flow control valve member 30 is brought into abutment with its seat 34, the pneumatic air flow between the both chambers will be subjected to a considerable throttling resistance at the orifice 35 and the piston 25 will perform a considerably retarded return movement.

Figure 2:
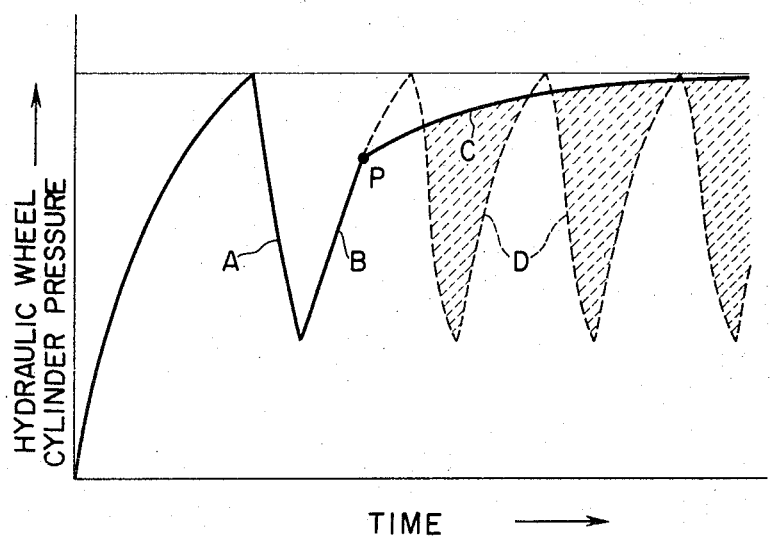
FIG. 2 is a comparative performance chart wherein the hydraulic wheel cylinder pressure is plotted against time, the full lines representing the inventive arrangement and the dotted lines showing a comparative conventional one.

Under these operating conditions, the once reduced hydraulic brake pressure along a curve A in FIG. 2, will be increased again rapidly within the stabilized braking region for effectively preventing a wheel skid with ground and along a curve B shown again therein until a predetermined point P is attained. Thence, the braking function is performed along a slowly increasing performance curve such as at C, without inviting a conventionally repeated brake release-and-reapplying cycles such as shown at D by dotted lines in FIG. 2. Therefore, during the braking operation taking place along the slowly increasing curve C, an effective and constantly applied braked condition is realized with the hydraulic brake system when relying upon the novel teaching of the invention. In this way, otherwise encountered unpleasant shocks caused by the repeated cycles of brake release and reapplication can be positively avoided. By adopting the present system, conventionally unavoidable excess release of the hydraulic brake pressure is avoided and the effective brake pressure can be applied for a considerably longer period than otherwise, and therefore, the overall braking period and distance can be shortened correspondingly, even when a considerable excess braking effort should be made by the vehicle driver.

Figure 3:
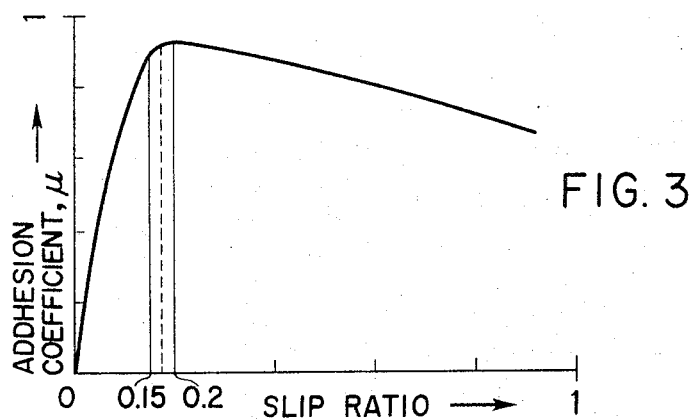
FIG. 3 is a representative $\mu$-S curve, showing the adhesion coefficient and the slip ratio.

In FIG. 3, the adhesion coefficient, $\mu$, has been plotted against the slip ratio: S, having been however drawn on a random scale. As seen from this figure, the highest value of the adhesion coefficient is at about 0.15–0.2. Therefore, it is highly effective to brake the vehicle wheels by utilizing the increasing region of the curve for obtaining better braking effect. The slip ratio between wheel and ground herein adopted is meant by a difference between vehicle running speed and wheel rotational and peripheral speed, being divided by the former speed. With the slip ratio: 1, the coefficient becomes a considerably lower value than the attainable highest as seen. Therefore, the braking period or distance will become longer, when the hydraulic braking pressure be excessively high, or conversely excessively lower from the optimal value which provides said coefficient being nearly 0.15–0.2. When the arrangement according to this invention is so designed that the instruction signal is delivered from the skid sensor when the slip ratio is beyond these optimum values preferably in the neighborhood of 0.15–0.2, the brake efficiency can be largely improved in comparison with comparative conventional hydraulic brake systems.

The flow control valve 30 as adopted in the foregoing is only an example of representative and preferable embodiments. Various and considerable modifications may be made from the specifically shown one, when observing the proposed nature of the flow control assembly which provides possibility for altering the hydraulic brake pressure increase speed upon the provisional release of the hydraulic brake pressure and upon the reapplication of the brake, and indeed, in two or more stages. The electromagnetic valve assembly 39 may be physically united with the control valve assembly 10 and 24 when necessary, or alternatively it may be separately mounted and arranged as hinted in FIG. 1.

It is to be noted that according to the invention otherwise ineffective and superfluous repetition of hydraulic pressure release and reincrease as denoted by several small triangular areas hatched by dotted lines (FIG. 2) is obviated so that the conventionally encountered ineffective release of the hydraulic braking pressure can be avoided. Finally, the term "skid" used throughout the specification and appended claims may be replaced by "lock."

It should be further noted that as the conventional skid sensor at 57 the arrangement shown in FIG. 4 at G or that shown in FIGS. 7 and 16 disclosed in our copending prior U. S. application Ser. No. 809,853 filed Mar. 24, 1969 may be used.

The embodiments of the invention in which an exclusive property or privilege is claimed are as follows:

1. An anti-skid brake control system for a plurality of wheels of a wheeled vehicle having brakes actuatable from a fluid source of pressure comprising a control valve assembly locatable in a hydraulic circuit between a hydraulic master cylinder and cylinder means for said wheels, said control valve assembly comprising a diaphragm piston movable within a cylinder and defining two pneumatic fluid chambers therein, an on-off control valve located in said hydraulic circuit for interrupting normal hydraulic communication between said master cylinder and said wheel cylinder means, hydraulic pressure reducing valve means located in said control valve assembly and adapted to move so as to increase the effective volume of said hydraulic circuit on the wheel cylinder side of said on-off control valve means, said on-off control valve means and said pressure reducing valve means normally being disposed in an inoperative position by said diaphragm piston, passage means providing communication between said pneumatic fluid chambers, electromagnetic device means operably located in said passage means and normally allowing communication between said two pneumatic fluid chambers, sensor means adapted for sensing a locked condition of at least one of said wheels upon sudden brake application, said electromagnetic valve means being responsive to said sensor upon detecting a locked condition to close communication between said two pneumatic chambers and admit ambient air to one of said chambers, connecting means adapted to connect the other of said chambers to a source of negative pressure, fluid flow control means located in said passage means, said flow control means being movable independently of said diaphragm piston between a first position allowing a relatively rapid flow of fluid through said passage means and a second position allowing a relatively restricted flow of fluid through said passage means whereby upon detection of a locked wheel condition ambient air will be admitted to said one of said chambers to move said diaphragm piston allowing hydraulic pressure from said master cylinder to close said on-off valve means and move said pressure reducing valve means to allow reduction of pressure in said wheel cylinders and upon sensing the unlocked condition of said wheel restoring communication between said chambers thereby moving said flow control means to said first position until the pressure differential between said chambers reaches a predetermined point whereupon said flow control means will move to said second position to allow a restricted flow of fluid to provide for a gradual movement of said diaphragm piston and a gradual build-up of pressure in said wheel cylinders.

2. An anti-skid brake control system as set forth in claim 1, wherein said flow control means is comprised of a one-way check valve having a valve member with a restricted orifice therethrough and spring means urging said valve member to said second position.

* * * * *

UNITED STATES PATENT OFFICE
CERTIFICATE OF CORRECTION

Patent No. 3,729,236            Dated April 24, 1973

Inventor(s)   Tosiaki Okamoto et al

It is certified that error appears in the above-identified patent and that said Letters Patent are hereby corrected as shown below:

In The Heading:

Assignee's name was mispelled. Should read:

Assignee: Aisin Seiki Company Limited

Signed and sealed this 26th day of February 1974.

(SEAL)
Attest:

EDWARD M. FLETCHER, JR.          C. MARSHALL DANN
Attesting Officer                Commissioner of Patents